US010374308B2

(12) United States Patent
Thorebäck

(10) Patent No.: US 10,374,308 B2
(45) Date of Patent: Aug. 6, 2019

(54) SIGNAL DISTRIBUTION NETWORK

(71) Applicant: TELEFONAKTIEBOLAGET LM ERICSSON (PUBL), Stockholm (SE)

(72) Inventor: Johan Thorebäck, Sundbyberg (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 365 days.

(21) Appl. No.: 15/301,920

(22) PCT Filed: Apr. 4, 2014

(86) PCT No.: PCT/SE2014/050422
§ 371 (c)(1),
(2) Date: Oct. 4, 2016

(87) PCT Pub. No.: WO2015/152782
PCT Pub. Date: Oct. 8, 2015

(65) Prior Publication Data
US 2017/0117629 A1 Apr. 27, 2017

(51) Int. Cl.
*H01Q 3/40* (2006.01)
*H01Q 3/26* (2006.01)
(Continued)

(52) U.S. Cl.
CPC ........... *H01Q 3/40* (2013.01); *H01Q 3/24* (2013.01); *H01Q 3/26* (2013.01); *H04B 7/0617* (2013.01); *H04B 7/0695* (2013.01)

(58) Field of Classification Search
CPC ... H01Q 3/40; H01Q 3/24; H01Q 3/26; H04B 7/0617; H04B 7/0695
See application file for complete search history.

(56) References Cited

U.S. PATENT DOCUMENTS 4,245,223 A * 1/1981 Evans ................. H01Q 25/007
343/778
4,318,104 A * 3/1982 Enein ...................... H01Q 3/40
342/372
(Continued)

FOREIGN PATENT DOCUMENTS

EP 2296225 A1 3/2011

OTHER PUBLICATIONS

Alagappan, et al., A Simplified 16-channel Butler Matrix for Parallel Excitation with the Birdcage Modes at 7T., Proceedings of International Society for Magnetic Resonance in Medicine, 2008.

*Primary Examiner* — Cassi J Galt

(57) ABSTRACT

A signal distribution network for an N-port antenna arrangement. The signal distribution network comprises first circuitry for receiving at least one input signal and implementing splitting of the at least one input signal into N/2 output signals, where N>1. The signal distribution network comprises second circuitry for providing N output signals to a respective antenna port and implementing splitting of N/2 input signals into the N output signals. The signal distribution network comprises switching circuitry, the switching circuitry being operatively connected between the first circuitry and the second circuitry, the switching circuitry implementing selectable connectivity between the first circuitry and the second circuitry such that the N/2 output signals of the first circuitry are provided as the N/2 input signals of the second circuitry. The signal distribution network comprises control circuitry configured to control the switching circuitry so as to selectively connect outputs of the first circuitry to inputs of the second circuitry, thereby selectively directing the N/2 output signals through the switching circuitry.

20 Claims, 11 Drawing Sheets

(51) Int. Cl.
*H04B 7/06* (2006.01)
*H01Q 3/24* (2006.01)

(56) References Cited

U.S. PATENT DOCUMENTS

| | | | | |
|---|---|---|---|---|
| 4,827,270 | A | * | 5/1989 | Udagawa ............... H01Q 19/17 333/116 |
| 5,353,032 | A | * | 10/1994 | Bertocchi ................. G01S 1/48 342/372 |
| 6,005,515 | A | | 12/1999 | Allen et al. |
| 6,791,507 | B2 | | 9/2004 | Johansson et al. |
| 7,741,997 | B1 | * | 6/2010 | Jacomb-Hood ........ H01Q 25/00 342/374 |
| 2004/0027305 | A1 | | 2/2004 | Pleva et al. |

* cited by examiner

SIGNAL DISTRIBUTION NETWORK

This application is a 371 of International Application No. PCT/SE2014/050422, filed Apr. 4, 2014, the disclosure of which is fully incorporated herein by reference.

TECHNICAL FIELD

Embodiments presented herein relate to signal distribution network for an N-port antenna arrangement, and to a method, and a computer program product for distributing a signal through distribution network for an N-port antenna arrangement.

BACKGROUND

In communications networks, it may be challenging to obtain good performance and capacity for a given communications protocol, its parameters and the physical environment in which the communications network is deployed.

One component of wireless communications networks where it may be challenging to obtain good performance and capacity is the antennas. For example, in order to perform beam-forming of one or multiple antenna beams/lobes towards desired directions for array antennas, the relative phase of the individual signals feeding the individual antenna ports needs to be controlled.

Such control may be enabled by generating individual electrical signals from individual digital signals, in which case the required phase shift is performed in the digital domain. This is referred to as digital beam-forming.

Alternatively, the individual electrical signals may be generated from a common analogue signal, which is split to the desired number of individual signals needed, followed by individual phase-shift in the analogue domain. This is referred to as analogue beam-forming.

Another option for analogue beam-forming is to use different forms of signal distribution networks. One commonly used implementation is the use of the so-called Butler matrix. In such implementations the signal splitting and phase-shifting is performed in the Butler matrix. Such an implementation may generally also require some additional signal switches in order to perform the selection of different beam directions.

There are also beam-forming architectures that use combinations of analogue and digital phase-shifting; e.g., using digital phase-shifting to control the beam in azimuth (sideways) and analogue phase-shifting to control the beam in elevation.

As the skilled person understands, the above disclosed means for beam-forming have their particular benefits and limitations. In general terms, digital beam-forming may be considered flexible and may support multiple simultaneous beams, but the implementation may be complicated as it requires individual signal conversion between the digital and the analogue domains. Analogue beam-forming may be advantageous from the perspective that it relies on analogue signal processing, which does not need to involve multiple instances of data converters (digital-to-analog converters and analog-to-digital converters) and/or up/down-converters. Signal processing is instead accomplished by means of splitting, combing and phase-rotations of analogue signal components. There will naturally be quality aspects to consider for the various parts in the analogue signal processing system, such as gain and phase ripple requirements over the pass-band, signal to noise level, nonlinear distortion effects etc. The analogue beam-forming may commonly be less complicated (such as physically smaller, physically lighter, consuming less power, etc.) than the digital beam-forming, but still a complicated design may be required in order to meet the above mentioned signal quality aspects. Another limitation for the above disclosed analogue beam-forming is that analogue beam-forming inherently only supports a single beam. Providing multiple beams may thus require multiple instances of phase-shifters or, for implementations based on using the Butler matrix, ways to connect multiple analogue signals to multiple inputs of the Butler matrix.

Another aspect of steerable antenna systems is the number of independent antenna ports needed in order to obtain certain performance, such as, but not limited to, antenna beam-width, scanning/deflection angles of the antenna beam, and undesired antenna beams (so-called side-lobes and grating-lobes). In general terms, the higher the number of antenna ports, the better the antenna performance may be controlled. However, using a higher number of elements may commonly require a larger amount of independently controlled signal paths, and associated functions such as amplifiers and up/down-converters (mixers).

For example, distribution networks using a standard form of the well-known 8-by-8 or 16-by-16 Butler Matrix will normally require a high number of components, such as 90-degree hybrid couplers. This tends to make the implementation un-practical considering the physical size and complexity of the distribution network.

Hence, there is still a need for improved distribution networks for antenna arrangements.

SUMMARY

An object of embodiments herein is to provide improved distribution networks for antenna arrangements. A particular object of embodiments herein is to provide efficient signal distribution to a large number (say, 8 or more) of antenna ports.

According to a first aspect there is presented a signal distribution network for an N-port antenna arrangement. The signal distribution network comprise first circuitry for receiving at least one input signal and implementing splitting of the at least one input signal into N/2 output signals, where N>1. The signal distribution network comprises second circuitry for providing N output signals to a respective antenna port and implementing splitting of N/2 input signals into the N output signals. The signal distribution network comprises switching circuitry, the switching circuitry being operatively connected between the first circuitry and the second circuitry, the switching circuitry implementing selectable connectivity between the first circuitry and the second circuitry such that the N/2 output signals of the first circuitry are provided as the N/2 input signals of the second circuitry. The signal distribution network comprises control circuitry configured to control the switching circuitry so as to selectively connect outputs of the first circuitry to inputs of the second circuitry, thereby selectively directing the N/2 output signals through the switching circuitry.

Advantageously this provides an improved distribution network for antenna arrangements.

Advantageously this enables the number of components in the disclosed distribution network be reduced compared to known distribution networks, thereby enabling the overall size of the distribution network to be reduced, made cheaper and consume less power, without impairing the functionality of known distribution networks.

According to a second aspect there is presented a network node comprising a signal distribution network according to the first aspect.

According to a third aspect there is presented a wireless terminal comprising a signal distribution network according to the first aspect.

According to a fourth aspect there is presented a method for distributing a signal through distribution network for an N-port antenna arrangement. The method comprises receiving at least one input signal and splitting the at least one input signal into N/2 output signals, where N>1, by first circuitry. The method comprises selectively directing the N/2 output signals through switching circuitry so as to provide the N/2 output signals of the first circuitry as N/2 input signals to second circuitry by control circuitry. The method comprises splitting the N/2 input signals into N output signals and providing the N output signals to a respective antenna port by the second circuitry.

According to a fifth aspect there is presented a computer program for distributing a signal through distribution network for an N-port antenna arrangement. The computer program comprising computer program code which, when run on a processing unit, causes the processing unit to perform a method according to the fourth aspect.

It is to be noted that any feature of the first, second, third, fourth, and fifth aspects may be applied to any other aspect, wherever appropriate. Likewise, any advantage of the first aspect may equally apply to the second, third, fourth and/or fifth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Further, all phase-shifts values in the figures are truncated, and the theoretical values should be according to n·180/16. For example, an angle value of ii degrees disclosed in the figures corresponds to a true angle value of 11.25 degrees; 33 degrees corresponds to 33.75 degrees, etc. In general terms, phase-shifts are to be interpreted as providing a phase delay. In general terms, a cosine function is understood to be 90 degrees ahead of a sinus function. In general terms, a cosine function combined with a 90 degree phase-shift will retard the cosine function by 90 degrees and thus make it equivalent to a sinus.

Figure 1:
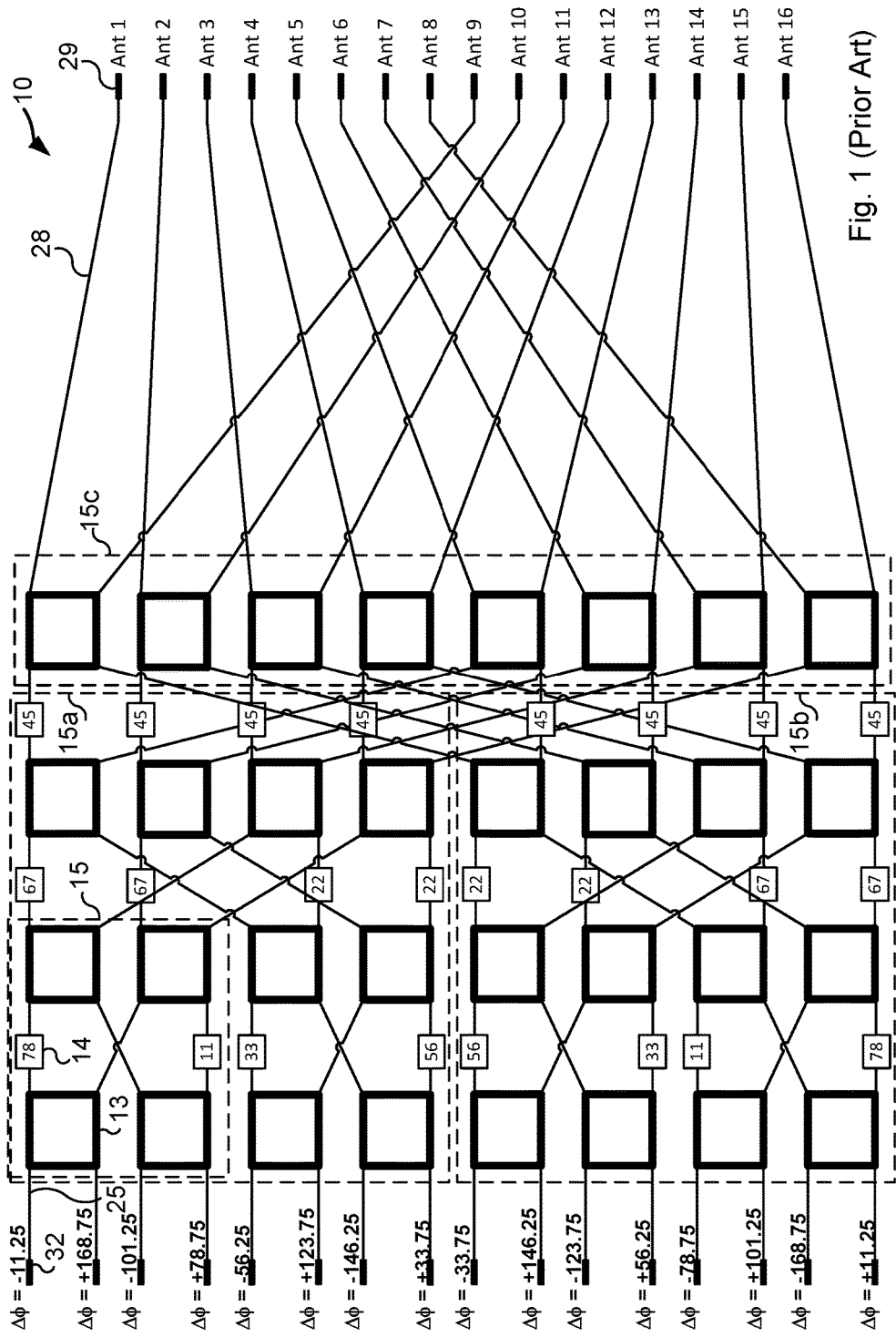
FIG. 1 is a schematic diagram illustrating a signal distribution network according to prior art.

FIG. 1 is a schematic diagram illustrating a signal distribution network 10 for an N-port antenna arrangement according to prior art. In more detail, FIG. 1 schematically illustrates a signal distribution network 10 for an N-port antenna arrangement based on a standard implementation of a 16-by-16 Butler Matrix having cells 15. This implementation includes 32 hybrid couplers 13 and 24 phase shifters 14.

The embodiments disclosed herein relate to improved signal distribution networks for an N-port antenna arrangement.

Figure 2A:
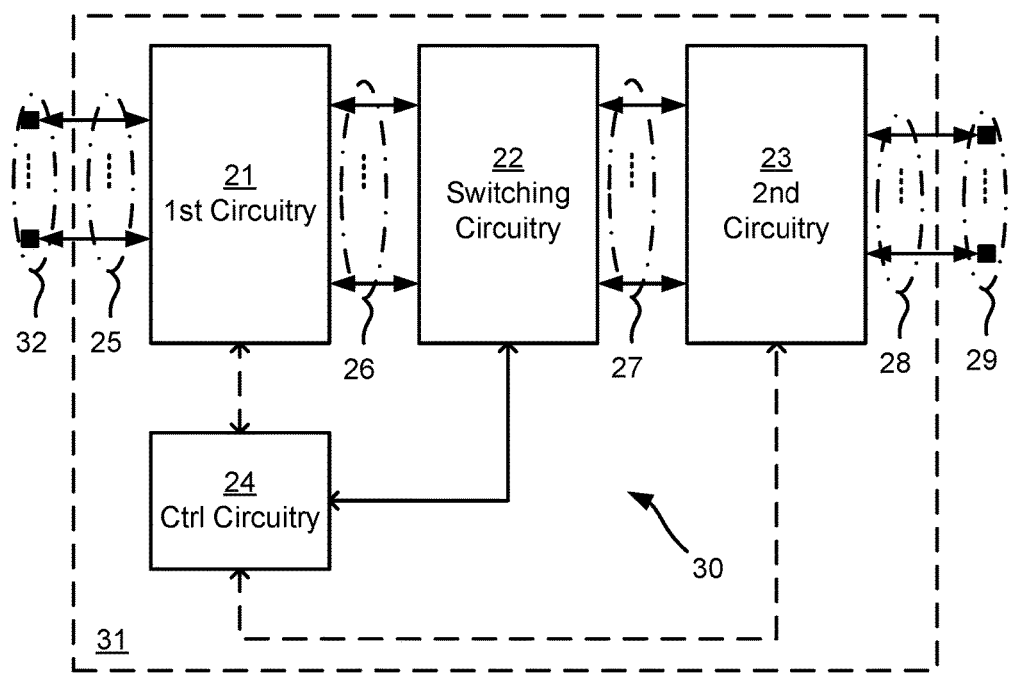
FIGS. 2a and 6-11 are schematic diagrams illustrating signal distribution networks according to embodiments.

By recognizing that there exists a symmetry along an horizontal center line through the Butler matrix, the inventor of the herein disclosed embodiments have realized that it may be possible to realize an equivalent functionality with use of a smaller size Butler Matrix and switching circuitry which will substitute some of the hybrid couplers. For example, along a horizontal center line through the signal distribution network 10 of FIG. 1, two subsets of Butler matrices 15a, 15b can be identified. According to embodiments disclosed herein these two Butler matrices 15a, 15b may be reduced to a single small Butler matrix and connected to a final column 15c of 90 degrees hybrid couplers by switches, or other circuitry, in such a way that a single N/2-by-N/2 Butler matrix can represent either of the two N/2-by-N/2 Butler matrices 15a, 15b, and make the whole circuit to represent the original N-by-N Butler matrix. Such a signal distribution network 30 for an N-port antenna arrangement 31 (where N>1 is an integer) is schematically illustrated in FIG. 2a.

Figure 4A:
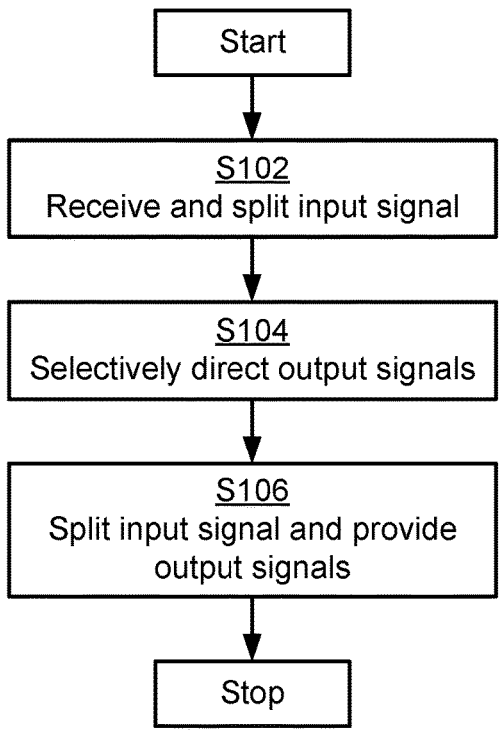
FIGS. 4a, 4b, 5a, and 5b are flowcharts of methods according to embodiments.
Figure 4B:
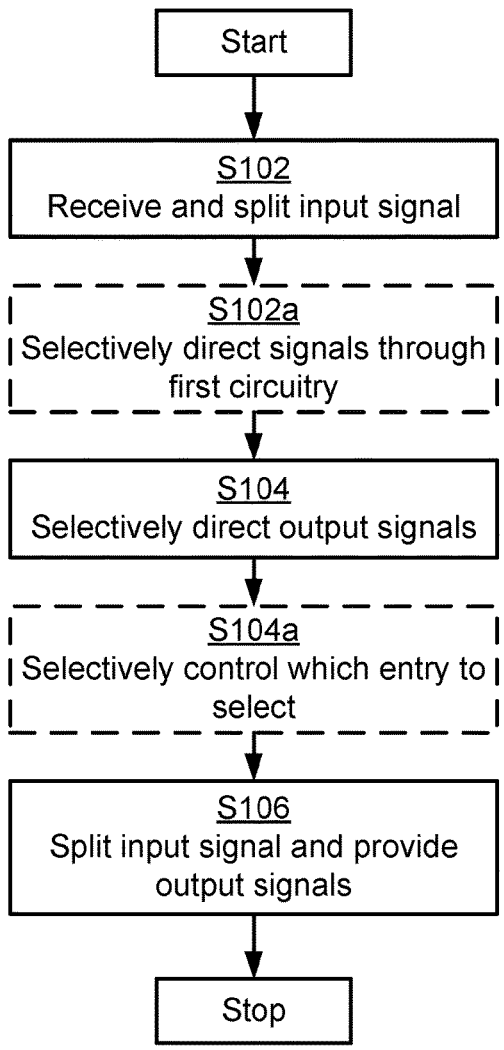

The signal distribution network 30 will mainly be described in a scenario where at least one signal is transmitted by antenna ports 29 of the signal distribution network 30 and thus received by radio chain ports 32, passed through first circuitry 21, switching circuitry 22, and second circuitry 23 in that order (see, for example, the methods disclosed with references to the flowcharts of FIGS. 4a and 4b) and then transmitted to the antenna ports 29. However, the signal distribution network 30 is also applicable to a scenario where N signals are received by antenna ports 29 of the signal distribution network 30 and thus passed through second circuitry 23, switching circuitry 22, and first circuitry 21 in that order and then transmitted to available radio chain ports 32. The latter case may involve a process of focusing signal power to the radio chain port 32 that is corresponding to the angle of the incident wave of a radio signal received by the antenna ports 29 (in practice some signal power will be present at the other antenna ports 29 as well, depending on the deviation from the theoretical angle and component deficiencies). See, for example, the methods disclosed with references to the flowcharts of FIGS. 5a and 45b).

The signal distribution network 30 comprises first circuitry 21. The first circuitry 21 is configured for receiving at least one input signal 25 from a corresponding number of radio chain ports 32 and for implementing splitting of the at least one input signal 25 into N/2 output signals 26.

The signal distribution network 30 comprises second circuitry 23. The second circuitry 23 is configured for providing N output signals 28 to a respective antenna port 29 and for implementing splitting of N/2 input signals 27 into the N output signals.

The signal distribution network 30 comprises switching circuitry 22. The switching circuitry 22 is operatively connected between the first circuitry 21 and the second circuitry 23. The switching circuitry is configured for implementing selectable connectivity between the first circuitry 21 and the second circuitry 23 such that the N/2 output signals of the first circuitry 21 are provided as the N/2 input signals of the second circuitry 23. In general terms the switching circuitry 22 should be defined by its functionality; it may be physically implemented as at least part of the first circuitry 21 or the second circuitry 23, or implemented as stand-alone circuitry with respect to the first circuitry 21 and the second circuitry 23.

The signal distribution network 30 comprises control circuitry 24. The control circuitry is configured to control the switching circuitry 22 so as to selectively connect outputs of the first circuitry 21 to inputs of the second circuitry 23, thereby selectively directing the N/2 output signals through the switching circuitry 22.

The proposed signal distribution network 30 (using a reduced Butler matrix structure compared to the signal distribution network 10 of FIG. 1) may be described as a way to reduce the physical realization of a size N Butler matrix to a smaller realization (e.g., size N/2, N/4 etc.) and regenerating/recreating the full size N functionality by means of splitting (in Tx mode) or combining (in Rx mode) the signals from a smaller Butler matrix cell by circuitry comprising 90 degrees hybrid couplers and reconfigurable phase shifting elements with the benefit of having a reduced physical implementation of multiple similar/identical instances of a specific circuitry. The phase shifting elements may involve means of selecting appropriate input ports of hybrid couplers, controlling sinus or cosinus phases of a local oscillator (LO), and/or selecting phase shifts from a bank of phase shift values.

Figure 2B:
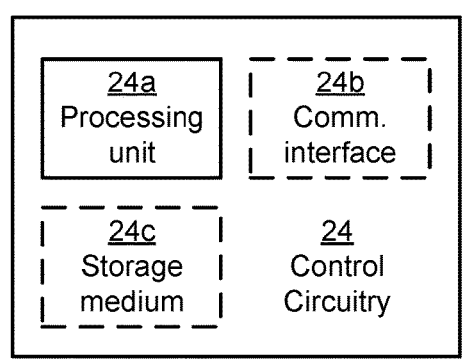
FIG. 2b is a schematic diagram showing functional modules of control circuitry according to an embodiment.

FIG. 2b schematically illustrates, in terms of a number of functional modules, the components of control circuitry 24 according to an embodiment. A processing unit 24a is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 36 (as in FIG. 3), e.g. in the form of a storage medium 24c. In this respect FIG. 2d is schematically illustrates an implementation of the signal distribution network 30 or an N-port antenna arrangement 31 comprising such a signal distribution network 30 in an ASIC according to an embodiment. The ASIC comprises two input ports 32, one local oscillator (LO) port, one control (Ctrl) port for controlling the control circuitry 24, and a Rx/Tx switch to switch the signal distribution network 30 or N-port antenna arrangement 31 between reception and transmission.

The processing unit 24a is arranged to execute methods as herein disclosed. The storage medium 24c may also comprise persistent storage, which, for example, can be any single one or combination of magnetic memory, optical memory, solid state memory or even remotely mounted memory. The control circuitry 24 may further comprise a communications interface 24b for receiving and transmitting signals to switching circuitry 22 and optionally to at least one of first circuitry 21 and second circuitry 23. As such the communications interface 24b may comprise one or more ports, comprising analogue and digital components. The processing unit 24a controls the general operation of the control circuitry 24 e.g. by sending signals to the communications interface 24b and the storage medium 24c, by receiving signals from the communications interface 24b, and by retrieving data and instructions from the storage medium 24c. Other components, as well as the related functionality, of the control circuitry 24 are omitted in order not to obscure the concepts presented herein.

Figure 2C:
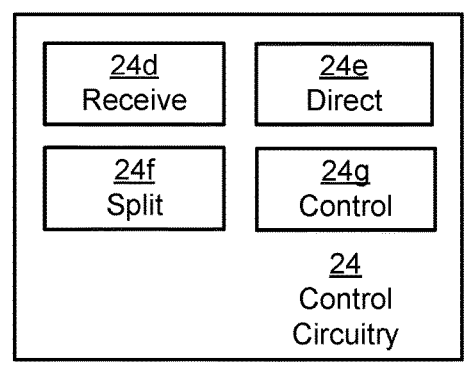
FIG. 2c is a schematic diagram showing functional units of a control circuitry according to an embodiment.
Figure 2D:
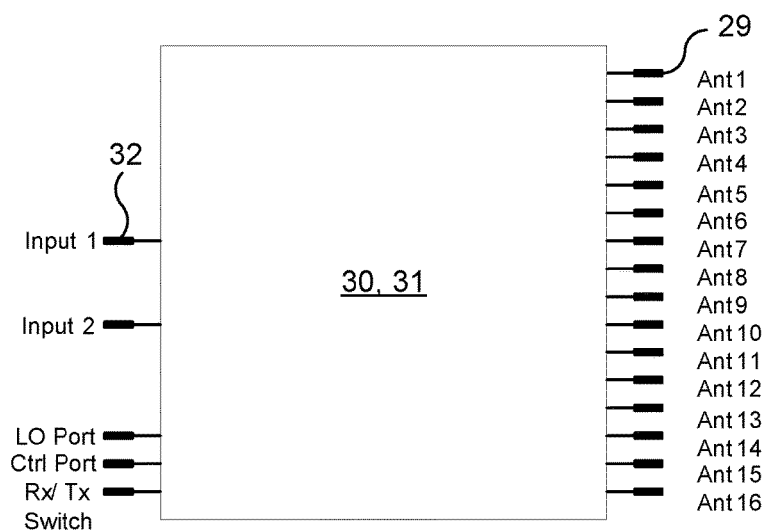
FIG. 2d is a schematic diagram showing an implementation of the signal distribution network according to an embodiment.

FIG. 2c schematically illustrates, in terms of a number of functional units, the components of control circuitry 24 according to an embodiment. The control circuitry 24 of FIG. 2c comprises a receive unit, 24d, a direct unit 24e, and a split unit 24f. The control circuitry 24 may further comprise a number of optional functional units, such as a control unit 24g. The functionality of each functional unit will be further disclosed below in the context of which the functional units may be used. In general terms, each functional unit may be implemented in hardware or in software. The processing unit 24a may thus be arranged to from the storage medium 24c fetch instructions as provided by a functional unit and to execute these instructions, thereby performing any steps as will be disclosed hereinafter.

Figure 2E:
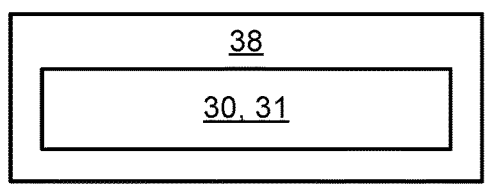
FIG. 2e is a schematic diagram illustrating a network node comprising an antenna arrangement according to an embodiment.
Figure 2F:
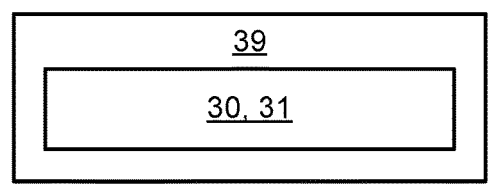
FIG. 2f is a schematic diagram illustrating a wireless terminal comprising an antenna arrangement according to an embodiment.

The signal distribution network 30 or the N-port antenna arrangement 31 comprising such a signal distribution network 30 may be provided as a standalone circuitry or as a part of a device. For example, the signal distribution network 30 or the N-port antenna arrangement 31 comprising such a signal distribution network 30 may be provided in a network node 13. FIG. 2e schematically illustrates a network node 38 comprising a signal distribution network 30 or an N-port antenna arrangement 31 comprising such a signal distribution network 30 as herein disclosed. The network node 38 may be a radio base station, such as a base transceiver station, a Node B, an Evolved Node B, or the like. For example, the first circuitry 21, the switching circuitry 22, the second circuitry 23, and the control circuitry 24 may be provided in a wireless terminal 14. FIG. 2f schematically illustrates a wireless terminal 39 comprising a signal distribution network 30 or an N-port antenna arrangement 31 comprising such a signal distribution network 30. The wireless terminal 39 may be a mobile phone, a user equipment, a smartphone, a tablet computer, a laptop computer, or the like. The signal distribution network 30 or the N-port antenna arrangement 31 comprising such a signal distribution network 30 may be provided as an integral part of the network node 38 or the wireless terminal 39. That is, the components of the signal distribution network 30 or the N-port antenna arrangement 31 comprising such a signal distribution network 30 may be integrated with other components of the network node 38 or wireless terminal 39; some components of the network node 38 or wireless terminal 39 and the signal distribution network 30 or the N-port antenna arrangement 31 comprising such a signal distribution network 30 may be shared.

Figure 3:
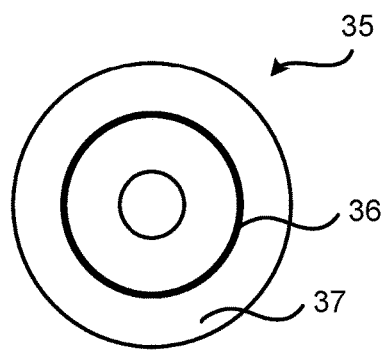
FIG. 3 is a schematic diagram of a computer program product according to an embodiment.

FIGS. 4a, 4b, 5a, and 5b are flow charts illustrating embodiments of methods for distributing a signal through distribution network 30 for an N-port antenna arrangement 31. The methods are advantageously provided as computer programs 36. FIG. 3 shows one example of a computer program product 35 comprising computer readable means 37. On this computer readable means 37, a computer program 36 can be stored, which computer program 36 can cause the processing unit 24a and thereto operatively coupled entities and devices, such as the communications interface 24b and the storage medium 24c, to execute methods according to embodiments described herein. The computer program 36 and/or computer program product 35 may thus provide means for performing any steps as herein disclosed.

In the example of FIG. 3, the computer program product 35 is illustrated as an optical disc, such as a CD (compact disc) or a DVD (digital versatile disc) or a Blu-Ray disc. The computer program product 35 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory. Thus, while the computer program 36 is here schematically shown as a track on the depicted optical disk, the computer program 36 can be stored in any way which is suitable for the computer program product 35.

Reference is now made to FIG. 4a illustrating a first method for distributing a signal through distribution network 30 for an N-port antenna arrangement 31 according to an embodiment. Continued references are also made to FIG. 2a.

The first method comprises, in a step S102, receiving at least one input signal 25 and splitting the at least one input signal into N/2 output signals 26, where N>1, by first circuitry 21.

The first method comprises, in a step S104, selectively directing the N/2 output signals through switching circuitry 22 so as to provide the N/2 output signals of the first circuitry 21 as N/2 input signals 27 to second circuitry 23 by control circuitry 24.

The first method comprises, in a step S106, splitting the N/2 input signals into N output signals 28 and providing the N output signals 28 to a respective antenna port 29 by the second circuitry 23.

Figure 5A:
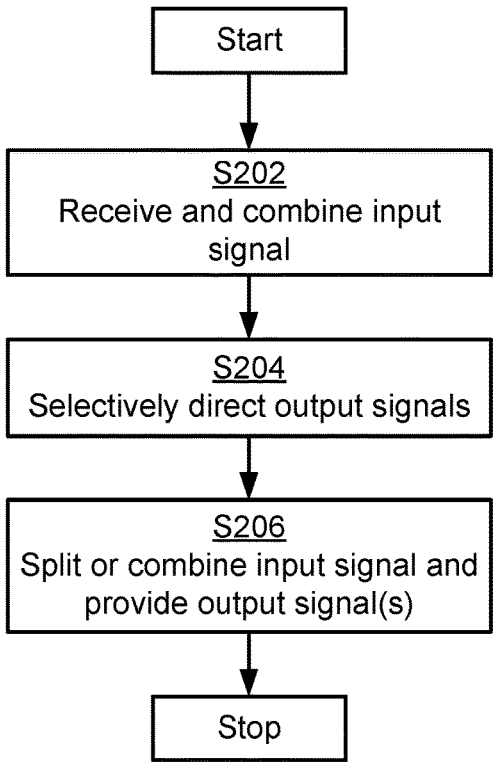
Figure 5B:
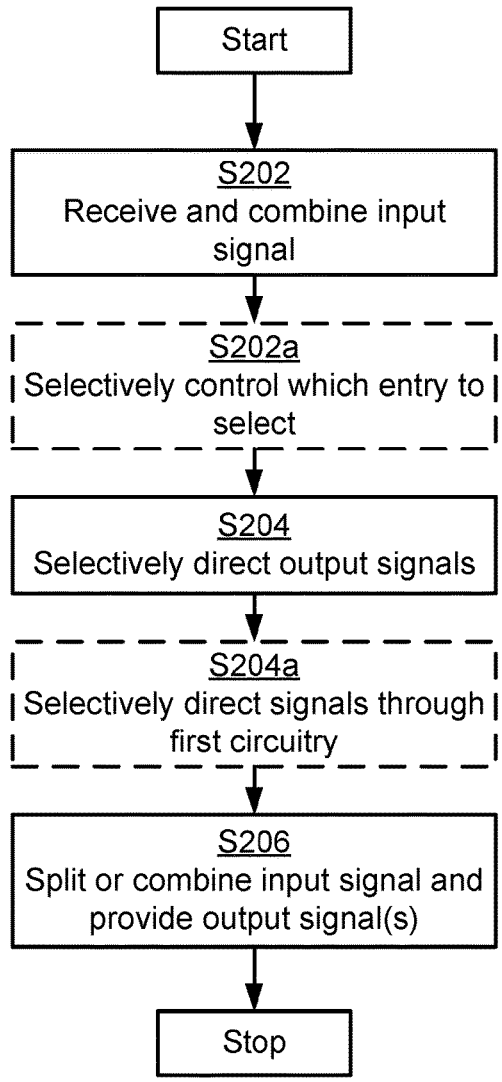

Reference is now made to FIG. 5a illustrating a second method for distributing a signal through distribution network 30 for an N-port antenna arrangement 31 according to an embodiment. Continued references are also made to FIG. 2a.

The second method comprises, in a step S202, receiving N input signals 28, where N>1, from a respective antenna port 29 and combining the N input signal into N/2 output signals 27 by second circuitry 23.

The second method comprises, in a step S204, selectively directing the N/2 output signals through switching circuitry 22 so as to provide the N/2 output signals of the second circuitry 23 as N/2 input signals 26 to first circuitry 21 by control circuitry 24.

The second method comprises, in a step S206, splitting or combining the N/2 input signals into at least one, and at most N/2, output signals 25 to a respective radio chain port 32 by the first circuitry 21.

N antenna signals may thereby be fed into the second circuitry 23 through the antenna ports 29. The N signals will be combined into N/2 (or N/4, N/8 etc.) signals passed through the switching circuitry 22 and the first circuitry 21. In the first circuitry 21 the N/2 signals (or N/4, N/8 etc.) will be combined according to the settings of switches (if applicable) and phase-shifters. Different angle of arrival at the antenna panel will make the signal maxima to occur at different radio chain ports 32 at the first circuitry 21.

The switching circuitry 22 may comprise N inputs and N outputs. Alternatively, the switching circuitry 22 may comprise N/2 inputs and N/2 outputs. The first circuitry 21 may comprise N/2 inputs. Alternatively the first circuitry 21 may comprise N/4 inputs. The second circuitry may comprise N/2 inputs and N outputs. N may be larger than two, and N may be a power of two. The first circuitry 21 may itself be constructed as containing a (another) first circuitry 21, a (another) switching circuitry 22 and a (another) second circuitry 23.

Embodiments relating to further details of signal distribution networks for N-port antenna arrangements will now be disclosed. Continued references are made to FIG. 2a and also to any of FIGS. 4a, 4b, 5a, 5b, and 6-11, where applicable.

According to some embodiments (e.g., the embodiments of FIGS. 7, 8, and 9) the first circuitry 21 comprises at least a first stage 81 for receiving the at least one input signal and a second stage 87 for providing the N/2 output signals. Inputs of at least the first stage 81 are pairwise connected, commonly referred to as hybrid combination. The first circuitry 21 may further comprise at least one further stage 85 operatively placed between the first stage 81 and the second stage 87. Such embodiments also enable the possibility to omit any common phase-shift that might exist; if in FIG. 7 only one input is to be used at a time, then the 78.75/90 degrees phase-shift pair could be substituted by a 0/11.25 degrees phase-shift pair, the 33.75/90 degrees phase-shift pair could be substituted by a 0/56.25 degrees phase-shift pair etc. But if all four inputs should be concurrently available, the only common denominator is the 11.25 degree phase-shift that would be possible to subtract from all first level phase-shifts in the embodiment of FIG. 7.

Figure 6:
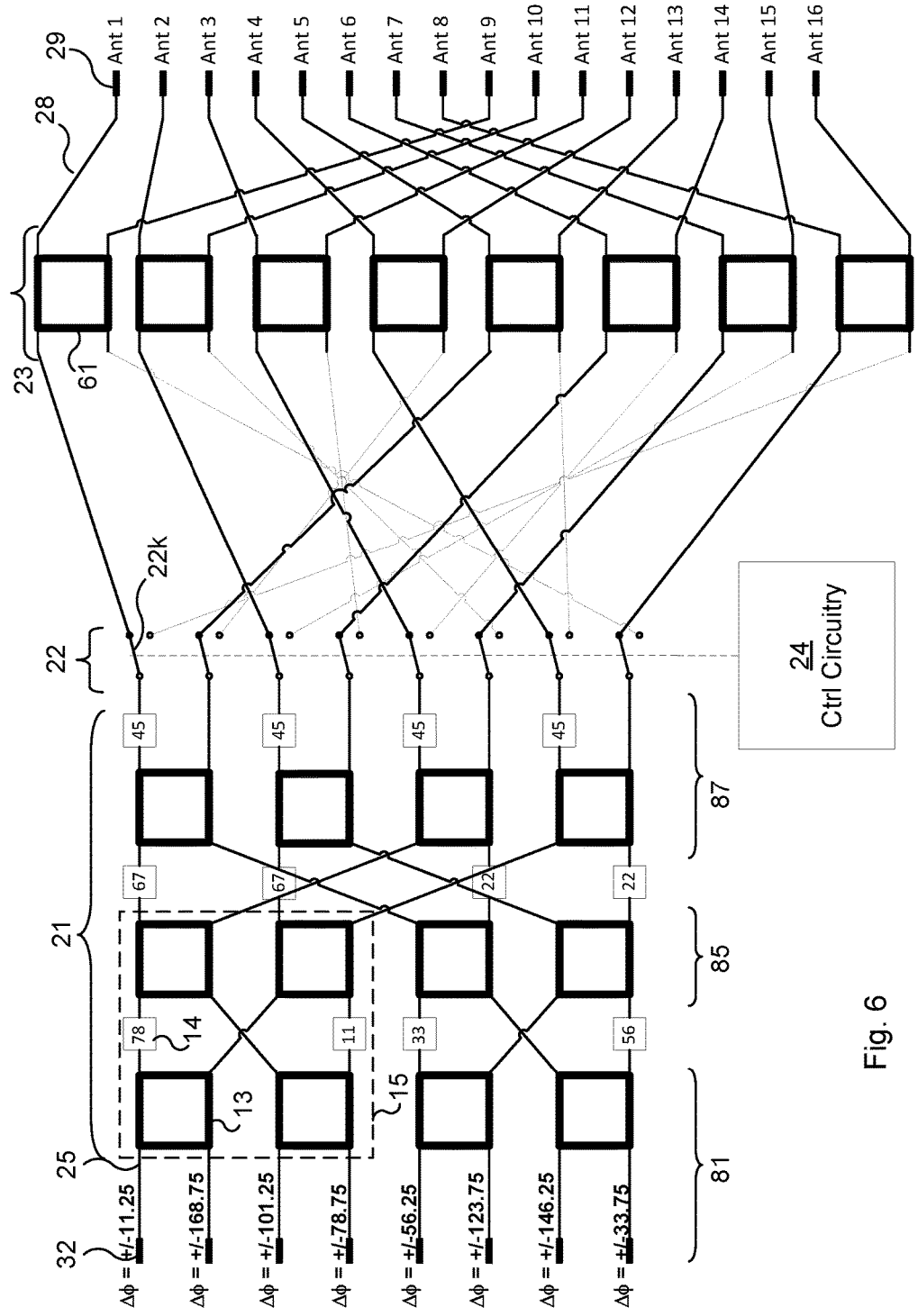
Figure 7:
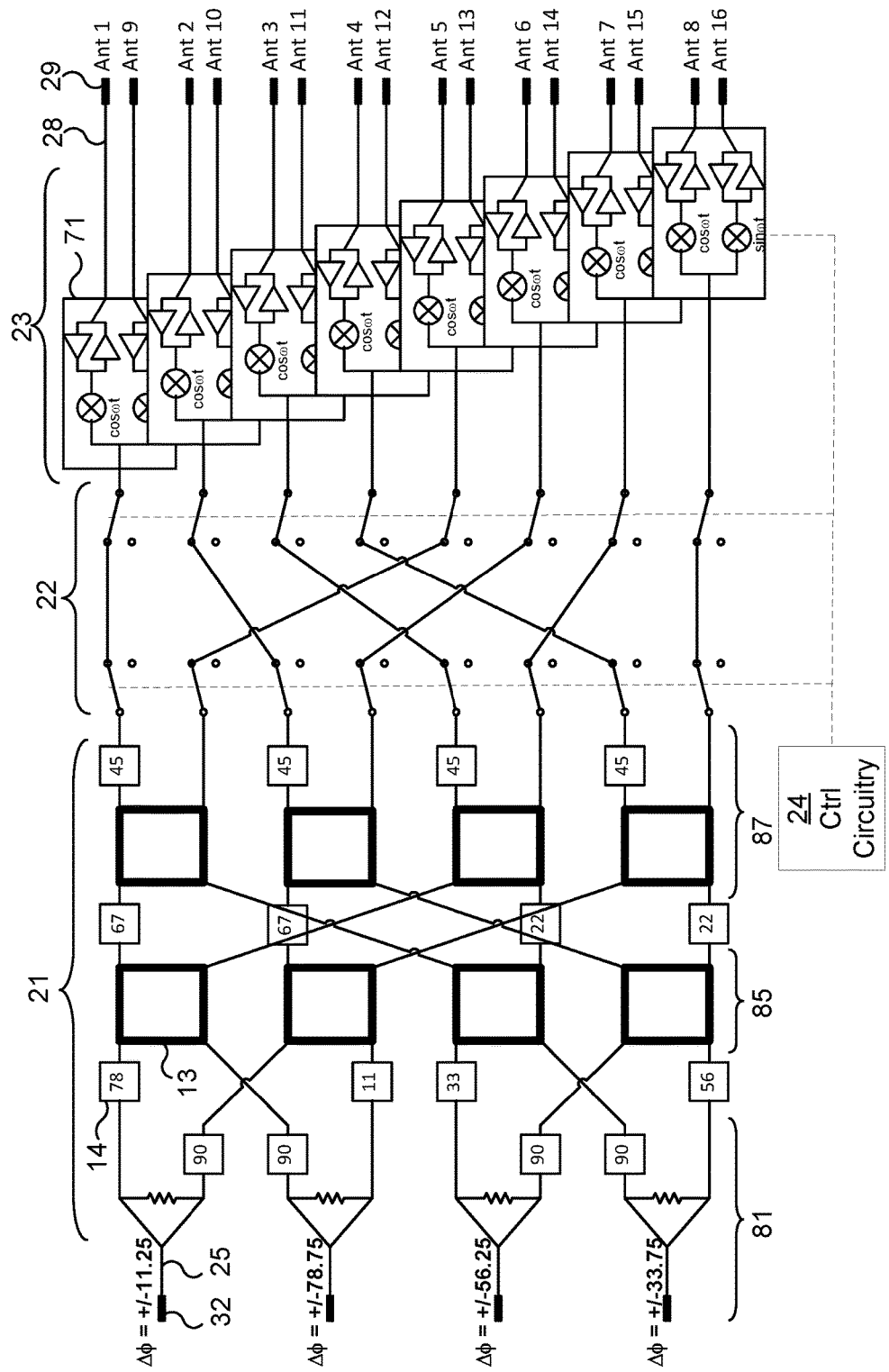
Figure 8:
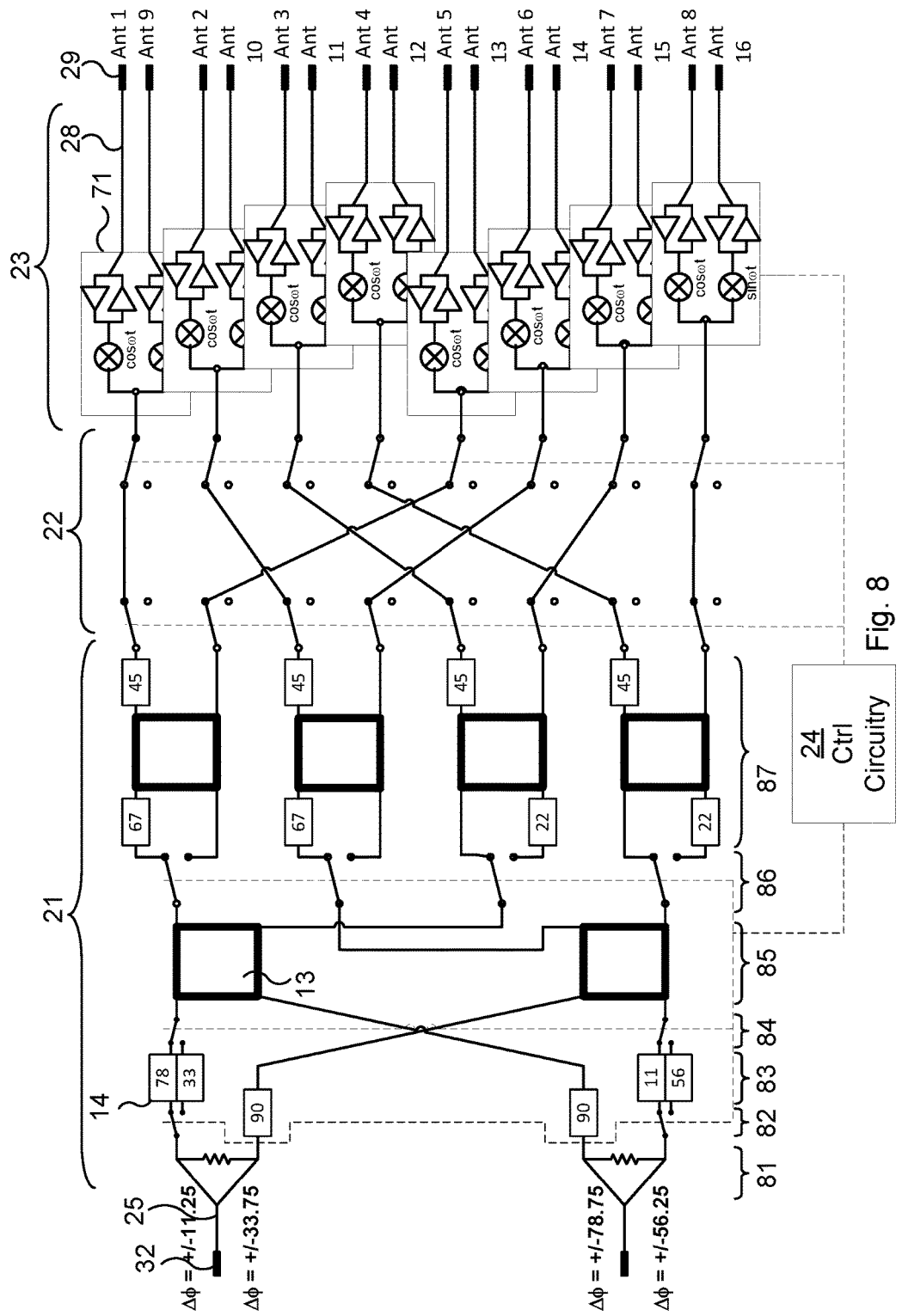
Figure 9:
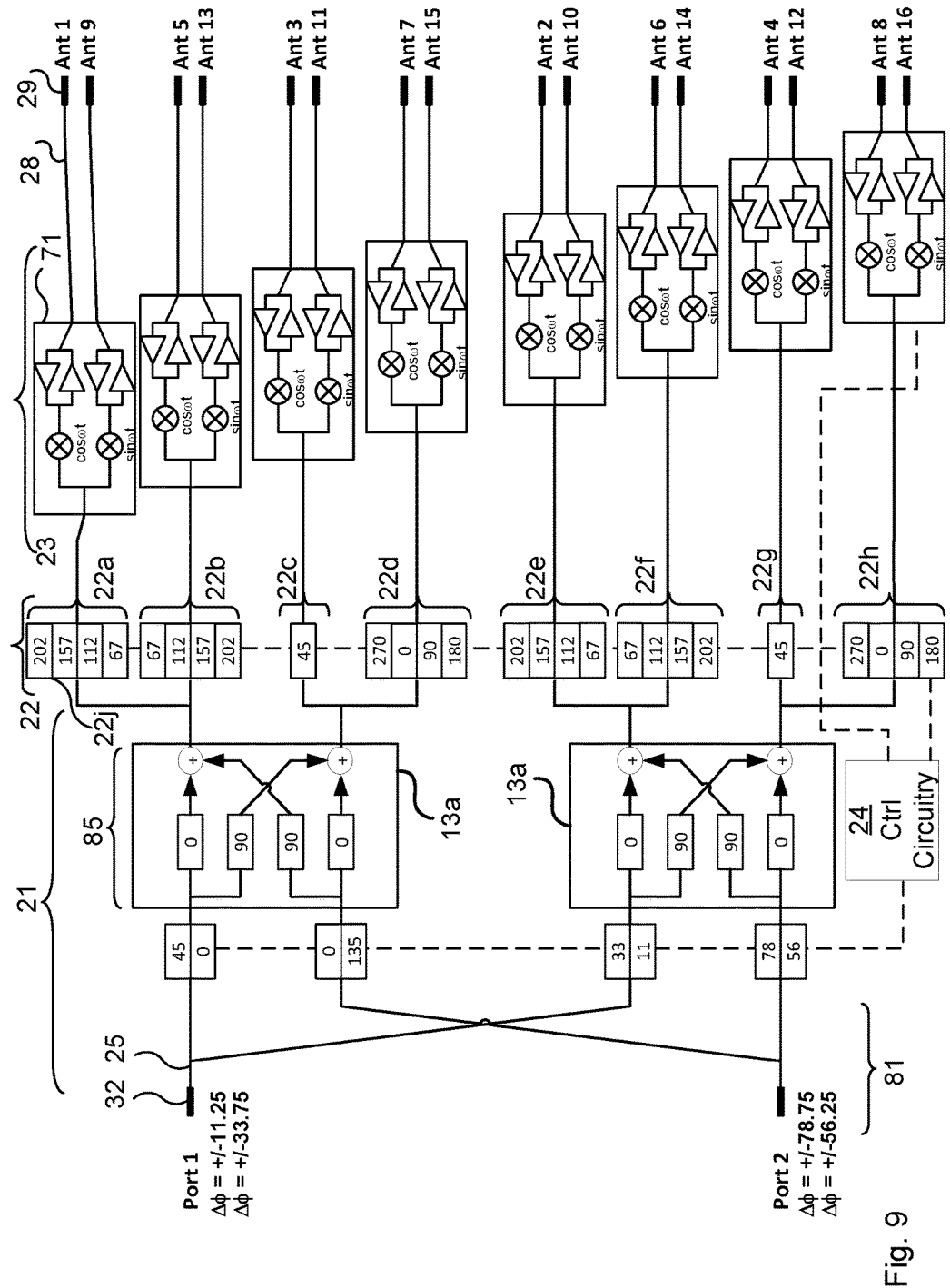

Further, according to some embodiments (e.g., the embodiments of FIGS. 6, 7, 8, 9) input ports 32 are consecutively pairwise combined. In the embodiment of FIG. 6 the first level of pairwise combining, or hybrid combination, is performed in stage 81, followed by two or more stages 85, 87 of pairwise combining the input signals. In the embodiment of FIG. 7 only signal split and proper phase delay of the signal components 25 is performed at stage 81 followed by two stages 85, 87 of 90-degree hybrid couplers. In the embodiments of FIGS. 8 and 9 the first stage 81 is only performing signal split and proper phase delay of the signal components 25. In the case of the embodiments in FIGS. 8 and 9 there is only one stage of pairwise combining. The second stage 87 is in these cases together with the switching stage 86 operating as a signal splitter and provision of different selectable phase delays for the N/2 outputs. Internal switches 82 and 84 are used for selecting which "lobes" to excite, either +/−11.25 degrees and +/−78.75 degrees, or +/−33.75 degrees and +/−56.25 degrees.

According to some embodiments (e.g., the embodiments of FIGS. 7, 8, and 9) the second circuitry 23 comprises mixers 71 for adjusting phases of the N output signals before being provided to the respective antenna port. The mixers 71 comprise cosine and sine multipliers. According to embodiments all multipliers can represent a sine or cosine phase function, where the possibility to swap between sine and cosine can be used as one possibility to set the proper state of the second circuitry 23. The mixers may either be implemented for performing phase shifting functionality ('mixers' are then substituted with 'vector modulators') without aim of performing frequency translation, or be implemented for performing frequency translation together with phase shift. The latter alternative may enable components to be reused.

According to some embodiments (e.g., the embodiment of FIG. 8) the first circuitry 21 comprises at least two stages 81, 83, 85, 87 and internal switches 82, 84, 86 interconnecting the at least two stages. The control circuitry 24 may be configured to in the first method control the internal switches 82, 84, 86, thereby selectively directing the at least one input signal through the first circuitry 21, step S102a. Alternatively the internal switches 82, 84, 86 may be considered as part of the switching circuitry 22. Such embodiments may be regarded as conceptually addressing an N/4 input to the first circuitry 21, which will then be expanded to N/2 outputs from the first circuitry 21. A single input solution may will also benefit of the reduced implementation in terms of that only a subset of phase shift values in banks of phase-shifters needs to be used, compared to a normal single input general signal distribution network (i.e. not aiming to mimic the phase-shifts of a Butler matrix) where one single input is split into the desired number of antenna ports, where each component is passing through an individually controllable phase-shifter (e.g. a digitally controlled phase shifter with discrete phase values which is a bank of phase-shifters or alternately a continuously adjustable analogue phase-shifter).

According to some embodiments the switching circuitry 22 comprises switches 22k for selectable connectivity between the first circuitry 21 and the second circuitry 23. Particularly, according to some embodiments (e.g., the embodiments of FIGS. 6, 7, 8, and 10) the switching circuitry 22 implements an interconnection matrix.

According to some embodiments the switching circuitry 22 comprises means for providing selection of selectable signal properties, such as phase delay values which may be selectable from filter banks. Particularly, according to some embodiments (e.g., the embodiments of FIG. 9) the switching circuitry 22 comprises N/2 sets 22a, 22b, 22c, 22d, 22e, 22f, 22g, 22h of phase adjustment values. The N/2 sets 22a-h of phase adjustment values may be regarded as filter banks. The control circuitry 24 may then be configured to in the first method selectively control which entry 22j in a respective one of the sets 22a-h to phase adjust a respective one of the N/2 output signals of the first circuitry 21, step S104a.

The control circuitry 24 may be configured to in the second method selectively control which entry 22j in a respective one of the sets 22a-h to phase adjust a respective one of the N/2 output signals of the second circuitry 23, step S202a. The control circuitry 24 may further be configured to in the second method control the internal switches 82, 84, 86, thereby selectively directing the at least one input signal through the first circuitry 21, step S204a. When implementing the second method the adders of the 90-degree hybrid couplers 13a in the embodiment of FIG. 9 are moved from their current location, see FIG. 12a, to new locations immediately to the left of the 0/90 degrees phase-shifters, see FIG. 12b. The hybrid couplers 13a are thus replaced with hybrid couplers 13b.

Figure 10:
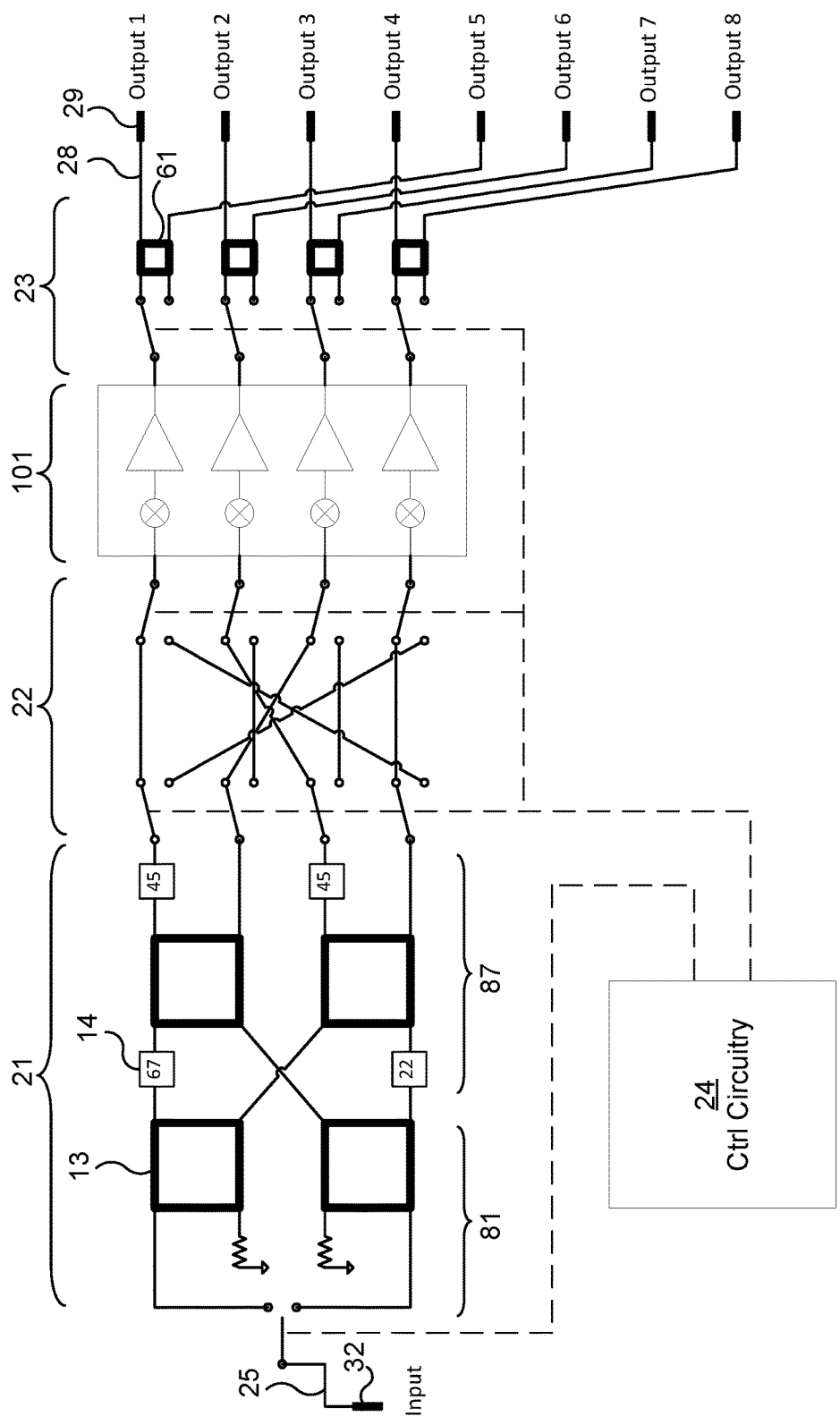
Figure 12A:
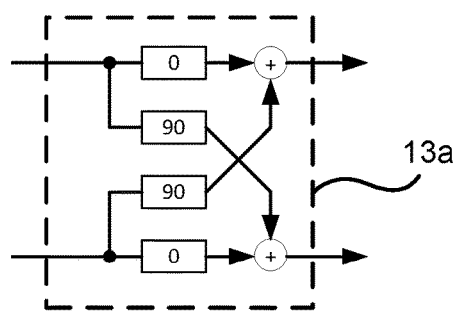
FIGS. 12a and 12b are schematic illustrations of hybrid couplers according to embodiments.
Figure 12B:
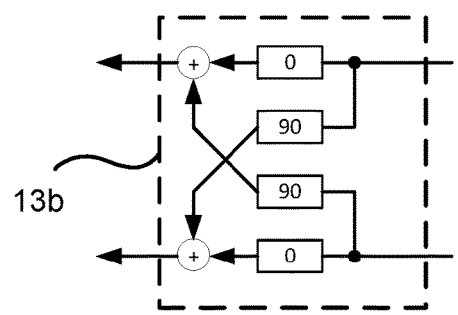

Some further, optional, properties of the first circuitry 21 will now be disclosed. At least one input of the first circuitry 21 may be electrically terminated. Such an embodiment is illustrated in FIG. 10 where two input of the first circuitry 21 are electrically terminated. The first circuitry 21 may comprise 90° hybrid couplers 13. Such an embodiment is illustrated in FIGS. 6, 7, 8, and 10. FIG. 12a schematically illustrates a functional view of a one-directional 90° hybrid coupler 13a for the signal distribution network 30 acting as a transmitter. FIG. 12b schematically illustrates a one-directional 90° hybrid coupler 13b for the signal distribution network 30 acting as a receiver. 90° hybrid couplers are also known as quadrature couplers, and include Lange couplers, branchline couplers, overlay couplers, edge couplers, and short-slot hybrid couplers.

The first circuitry 21 may comprise at least one Butler matrix 15. Such an embodiment is illustrated in FIGS. 6, 7, and 10. The first circuitry 21 may be configured for operation between baseband and radio frequency. In general terms, the input signals to the first circuitry 21 may not be baseband signals but represented at an intermediate frequency (IF). In practice there has to be a carrier frequency (i.e., a reference frequency) that all the phase shifts are referred to. Thus the first circuitry 21 may be operable from IF input to IF output, from radio frequency (RF) input to RF output, or from IF input to RF output. If one were to consider a pure baseband (BB) input to the first circuitry 21 such a signal could be directly converted into an IF or RF signal before entering the first circuitry 21. Alternately some or all stages of the herein disclosed signal distribution network 30 could be processed in BB form, possibly resulting in two parallel signal distribution networks 30 due to the two complex components (i.e., the in-phase component and the quadrature component) of the BB signal, as well as requiring converting between rectangular and polar representation as phase rotation operations may be performed in polar form of the BB signal. Addition operations may be performed in rectangular form of the BB signal.

Some further, optional, properties of the second circuitry 23 will now be disclosed. In general terms, components of the second circuitry 23 may correspond to components of the first circuitry 21. The second circuitry 23 may comprise branchline hybrids 61. Such embodiments are illustrated in FIGS. 6 and 10. The branchline hybrids 61 may be implemented by Wilkinson splitters. The second circuitry may be configured for operation between BB and RF (inclusive).

The signal distribution network 30 may further comprise signal processing circuitry 101. The signal processing circuitry 10 is arranged to be interconnected between the switching circuitry 22 and the second circuitry 23. Such an embodiment is illustrated in FIG. 10. There may thus be a provision to add optional circuitry, such as signal processing circuitry 101, which may include at least one of power amplifiers, low-noise amplifiers, mixer(s), and/or filters. Hence, the the signal processing circuitry 101 may implement at least one of a respective power amplifier, low-noise amplifier, filter, and mixer for each of the N/2 input signals to the second circuitry 23. The signal distribution network 30 makes is possible to reduce the total number of such components, as the disclosed signal distribution network 30 is based on parallel signal paths at the interface to/from the optional circuitry 101. For example, if instead a standard 8-by-8 Butler matrix was used, the corresponding equivalent interface were to consist of 8 parallel signal paths. The control circuitry 24 may further be configured to selectively connect outputs of the signal processing circuitry 101 to inputs of the second circuitry 23.

The signal distribution network 30 may be part of an antenna arrangement 31. Hence the antenna arrangement 31 may comprise any of the herein disclosed signal distribution networks 30.

Particular embodiments of signal distribution networks for N-port antenna arrangements will now be disclosed with references to FIGS. 6-11.

The embodiment of FIG. 6 represents a realization of a 16×16 Butler matrix that preserves all existing 16 lobes at the output. The lobes are represented by the output ports (element ports) having an incremental/decremental phase difference ($\Delta\Phi$=168.75, +n·22.5 degrees between all ports 1 through 16, $\Delta\Phi_{max}$=168.75, $\Delta\Phi_{min}$=−168.75). The first circuitry 21 is essentially an 8×8 Butler matrix (an identical structure but with different phase-shift values compared to a standard 8×8 Butler matrix). However, the specific realization in FIG. 6 may put a restriction on the number of simultaneously available lobes, which will be limited to 8 lobes (which follows from the number of input ports). As can be seen, the input ports are all denoted with a +/− sign, which follows from the fact that it is the state of the switching circuitry 22 that governs whether the lobe will be 'plus' or 'minus'. For one state of the switching circuitry 22 the following lobes will be available: $\Delta\Phi$=−11.25, +168.75, −101.25, +78.75, −56.25, +123.75, −146.25 and +33.75 degrees, while the other state have the same values but with all signs switched. In the particular realization of FIG. 6 the switching circuitry 22 may be regarded as an integral part of the second circuitry 23, as a way to avoid implementing 16 switches (8 switches at the output section of the switching circuitry 22 and 8 switches before the 8 hybrid couplers in the second circuitry 23); instead here only a total of 8 switches are necessary.

The embodiment of FIG. 7 represents a similar reduced 16×16 Butler matrix as in FIG. 6, but with modifications as summarized next.

Firstly, the first level of four hybrid couplers in the first circuitry 21 has been replaced by four power splitters and four 90 degrees phase shifters. In this way, there will only be four input ports available, but they will still represent a positive or negative phase increment depending on the settings of the switching circuitry 22, as in FIG. 6, giving access to a total of 8 distinct lobes. The remaining 8 lobes from FIG. 6 are no longer available due to the substitution of hybrid couplers with power splitters. The choice has been to keep the lobes represented by phase increment/decrement less than 90 degrees between the neighboring antenna ports. It may be of interest to also keep the phase increments +/−101.25 degrees by keeping the hybrid coupler with the input ports 101.25 and 78.75 degrees.

Secondly, the switching circuitry 23 is realized with switches as a dual-state commutator, which requires 16 switches in this embodiment.

Thirdly, the necessary state change in the second circuitry 23 (where the leading and lagging 90 degree phase shift between ports 1 and 9, 2 and 10 etc. is controlled), is according to the embodiment of FIG. 7 realized by control of the LO phase to the mixer (up-converter). One main purpose of the mixers is to perform frequency translation from IF to RF (for downlink) or vice versa (for uplink). In this way the mixers will also serve an additional function of controlling the phase shifts between the pairs of output ports.

The number of simultaneously available lobes in the embodiment of FIG. 7 is four, either $\Delta\Phi$=−11.25, +78.75, −56.25 and +33.75 degrees (with the switching circuitry 23 in a first state) or $\Delta\Phi$=+11.25, −78.75, +56.25 and −33.75 degrees (with the switching circuitry 23 in a second state).

The embodiment of FIG. 8 represents a generalization of a reduced 16×16 Butler matrix, where the input ports have been reduced to half the number of input ports compared to the embodiment of FIG. 7. There are in the embodiment of FIG. 8 only two simultaneously available lobes available: $\Delta\Phi$=−11.25 and +78.75 degrees (with the circuitry 21, 22, 23 in a first state); $\Delta\Phi$=−56.25 and +33.75 degrees (with the circuitry 21, 22, 23 in a second state); $\Delta\Phi$=+11.25 and −78.75 degrees (with the circuitry 21, 22, 23 in a third state); or $\Delta\Phi$=+56.25 and −33.75 degrees (with the circuitry 21, 22, 23 in a fourth state). The control circuitry 24 may be configured to control the state of the circuitry 21, 22, 23 by performing step S104 or step S104a.

The signal distribution network of FIG. 8 may be regarded as comprising first circuitry 21 having a first stage 81, a second stage 83, a third stage 85 and a fourth stage 87, switching circuitry having a first stage 82, a second stage 84, a third stage 86, and a fourth stage 22, and second circuitry 23 (controlled by control circuitry 24, as in step S102a). As noted above, the first stage 82, the second 84 stage, and the third stage 86 of the switching circuitry may be part of the first circuitry 21. In the first stage 81 inputs are pairwise connected. Then follows a first switching stage 82 followed by second stage 83 comprising phase delays. The second stage 83 is followed by a second switching stage 84 followed by a third stage 85. The third stage 85 essentially comprises two Butler matrix cells 13, each corresponding to a Wilkinson splitter, preceded and followed by different selectable phase shifts instead of the common 45-degree phase shifts in the standard 4×4 Butler matrix. Following the third stage 85 is a third switching stage 86 followed by a fourth stage 87 comprising further Butler matrix cells.

The embodiment of FIG. 9 is functionally comparable (or even identical) to the embodiment of FIG. 8, although the first circuitry 21, the switching circuitry 22, and the second circuitry 23 may comprise different elements. According to the embodiment of FIG. 9 the first circuitry 21 (here defined from input ports to the four summation points) is here realized in a discrete form, where signals are treated as node values. Two input ports (nodes) 32 are split into two sets of identical signals, and then individually phase shifted, then hybrid combined into pairs, split into 8 signals which are individually phase-shifted, and finally split into 16 signals and phase-shifted by 0 and 90 degrees. According to the embodiment of FIG. 9 there is a different realization of the switching circuitry 22 compared to the embodiment of FIG. 8. According to the embodiment in FIG. 9 the switching circuitry 22 is implemented as a bank of phase shifters. 23. Following the switching circuitry 22 is a second circuitry 23 corresponding to the second circuitry 23 of FIG. 8.

The embodiment of FIG. 10 represents a realization based on boundary conditions for a system architecture that limits the number of mixers, power amplifiers, low noise amplifiers, etc. to four, and where eight antenna ports are desired. If the switch at the input of the first circuitry 21 is discarded, this embodiment corresponds to a 8×8 Butler matrix that has been reduced to a first circuitry 21 essentially representing a 4×4 Butler followed by switching circuitry 22 and second circuitry 23 with integrated mixers, power amplifiers, and low noise amplifiers. Two of the four Butler input ports have been omitted (terminated) so there can only be two simultaneous input signals, either generating phase increments of +22.5 and −67.5 degrees; or alternately −22.5 and +67.5 degrees. Increments +/−112.5 and +/−157.5 degrees are omitted.

Figure 11:
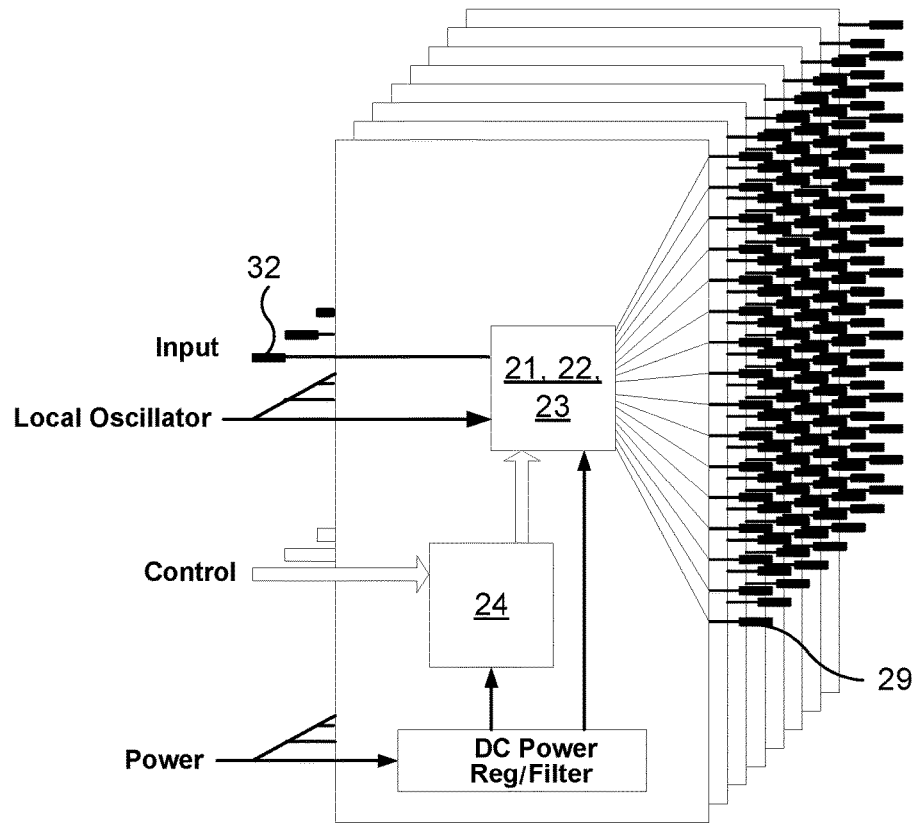

FIG. 11 represents an embodiment where several parallel realizations of the herein disclosed signal distribution network 30 are used to build up a two-dimensional antenna array. According to at least the embodiment of FIG. 11, each instance of the signal distribution network 30 is inherently one-dimensional. In more detail, the embodiment of FIG. 11 represents an application wherein digital beam forming is used in the azimuth direction and analog beam forming using any of the herein disclosed signal distribution networks in the elevation direction. The arrangement of FIG. 11 comprises eight vertically placed signal distribution networks as herein disclosed. Each signal distribution network has its own set of radio chain ports 32 (for example two radio chains for each placed signal distribution network) and together the eight vertically placed signal distribution networks comprise 16-by-8 antenna ports 29. In FIG. 11 a common local oscillator signal is used by all signal distribution networks. Alternatively each signal distribution network may be connected to individual, but correlated, local oscillators. Also a common power source may be connected to all signal distribution networks. Control of the signal distribution networks may be individual or common. A vertical beam shaping network is thus provided for each antenna column by a separate dual-lobe board. Horizontal beam forming is performed by appropriate signal phasing of the input signals. According to one illustrative example each antenna port is assumed to feed an individual antenna port. 16-by-8 antenna ports correspond to an array factor of 21 dB, and a total antenna gain of 27 dBi with an assumption of 6 dBi element gain. An assumption of a maximum of 55 dBm equivalent isotropically radiated power (EIRP) corresponds to a maximum total average RF power to antenna of 28 dBm, a maximum average RF power from each column/ASIC to be 19 dBm (no losses assumed), and a maximum average RF output power from each power amplifier to be 7 dBm.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

For example, as the skilled person understands, some of the herein disclosed embodiments are readily combinable with other ones of the herein disclosed embodiments. For example, any of the herein disclosed signal distribution networks may comprise signal processing circuitry 101. For example, the embodiment of FIG. 10 may comprise mixers 71 instead of branchline hybrids 61. For example, the embodiment of FIG. 9 may comprise branchline hybrids 61 instead of mixers 71, and so on.

For example, all beam-forming properties of the herein disclosed signal distribution network 30 are omni- or bi-directional. The herein disclosed signal distribution network 30 may thus be used both for transmission and reception; both in the uplink and in the downlink, with modifications that are apparent by the skilled person.

The invention claimed is:

1. A signal distribution network for an N-port antenna arrangement, comprising:
   first circuitry comprising reconfigurable phase shifting elements and hybrid couplers in matrix formation for receiving at least one input signal and arranged for splitting of the at least one input signal into N/2 output signals, where N is an even number greater than 2;
   second circuitry for implementing splitting of N/2 input signals into the N output signals and providing each of the N output signals to a respective antenna port of the N antenna ports;
   switching circuitry, the switching circuitry being operatively connected between the first circuitry and the second circuitry, the switching circuitry implementing selectable connectivity between the first circuitry and the second circuitry such that the N/2 output signals of the first circuitry are provided as the N/2 input signals of the second circuitry; and
   control circuitry configured to control the switching circuitry so as to selectively connect outputs of the first circuitry to inputs of the second circuitry, thereby selectively directing the N/2 output signals through the switching circuitry.

2. The signal distribution network according to claim 1, wherein the first circuitry comprises at least a first stage for receiving the at least one input signal and a second stage for providing the N/2 output signals, and wherein inputs of at least the first stage are pairwise connected.

3. The signal distribution network according to claim 1, wherein the second circuitry comprises mixers for adjusting phases of the N output signals before being provided to the respective antenna port.

4. The signal distribution network according to claim 1, wherein the first circuitry comprises at least two stages and internal switches interconnecting the at least two stages, and wherein the control circuitry is configured to control the internal switches, thereby selectively directing the at least one input signal through the first circuitry.

5. The signal distribution network according to claim 1, wherein the switching circuitry comprises N/2 sets of phase adjustment values, and wherein the control circuitry is configured to control which entry in a respective one of the sets to phase adjust a respective one of the N/2 output signals of the first circuitry.

6. The signal distribution network according to claim 1, wherein at least one input of the first circuitry is electrically terminated.

7. The signal distribution network according to claim 1, wherein the switching circuitry comprises N inputs and N outputs.

8. The signal distribution network according to claim 1, wherein the first circuitry comprises N/2 inputs.

9. The signal distribution network according to claim 1, wherein the first circuitry comprises N/4 inputs.

10. The signal distribution network according to claim 1, wherein the second circuitry comprises N/2 inputs and N outputs.

11. The signal distribution network according to claim 1, wherein the switching circuitry implements an interconnection matrix.

12. The signal distribution network according to claim 1, wherein the first circuitry comprises at least one Butler matrix.

13. The signal distribution network according to claim 1, wherein the second circuitry comprises branchline hybrids.

14. The signal distribution network according to claim 1, wherein the second circuitry comprises Wilkinson splitters.

15. The signal distribution network according to claim 1, wherein the second circuitry is configured for operation at radio frequency.

16. The signal distribution network according to claim 1, further comprising signal processing circuitry interconnected between the switching circuitry and the second circuitry, wherein the signal processing circuitry implements at least one of a respective power amplifier, low-noise amplifier, filter, and mixer for each of the N/2 input signals to the second circuitry.

17. The signal distribution network according to claim 16, wherein the control circuitry further is configured to selectively connect outputs of the signal processing circuitry to inputs of the second circuitry.

18. An antenna arrangement comprising:
   N antenna ports; and
   a signal distribution network, according to claim 1, coupled to the N antenna ports.

19. A method for distributing a signal through a distribution network for an N-port antenna arrangement, the method comprising:
   receiving at least one input signal and splitting the at least one input signal into N/2 output signals by first circuitry utilizing reconfigurable phase shifting elements and hybrid couplers in matrix formation, where N is an even number than 2;
   selectively directing the N/2 output signals through switching circuitry so as to provide the N/2 output signals of the first circuitry as N/2 input signals to second circuitry by control circuitry; and
   splitting the N/2 input signals into N output signals and providing each of the N output signals to a respective antenna port by the second circuitry.

20. A non-transitory computer readable storage medium comprising computer program instructions that, when executed by a processing unit of a control circuitry, causes a signal distribution network for an N-port antenna arrangement to:
   receive at least one input signal and split the at least one input signal into N/2 output signals by first circuitry of the signal distribution network, the first circuitry comprising reconfigurable phase shifting elements and hybrid couplers in matrix formation, where N is an even number greater than 2;
   selectively direct the N/2 output signals through switching circuitry of the signal distribution network so as to provide the N/2 output signals of the first circuitry as N/2 input signals to second circuitry of the signal distribution network; and
   split the N/2 input signals into N output signals and provide each of the N output signals to a respective antenna port by the second circuitry.

* * * * *